US006636726B1

(12) United States Patent
Erhage

(10) Patent No.: US 6,636,726 B1
(45) Date of Patent: Oct. 21, 2003

(54) METHOD AND ARRANGEMENT FOR RADIO COMMUNICATION

(75) Inventor: Lars Erhage, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 451 days.

(21) Appl. No.: 09/598,583

(22) Filed: Jun. 21, 2000

(30) Foreign Application Priority Data

Jun. 22, 1999 (SE) ........................................... 9902370

(51) Int. Cl.[7] ........................................... H04B 1/04

(52) U.S. Cl. ..................... 455/132; 455/562; 455/102; 342/159; 342/162; 342/379; 342/383

(58) Field of Search ......................... 455/19, 132, 20, 455/21, 82, 562, 102, 103, 112, 205, 206, 304, 42, 83; 342/159, 162, 379, 16, 17, 380, 383

(56) References Cited

U.S. PATENT DOCUMENTS 3,964,065 A * 6/1976 Roberts et al. ............. 342/380
4,313,116 A * 1/1982 Powell et al. ............... 342/380
5,027,124 A 6/1991 Fitzsimmons et al.
5,218,359 A * 6/1993 Minamisono ............... 342/383
5,339,284 A * 8/1994 Kaiser ........................ 367/103
5,481,270 A * 1/1996 Urkowitz et al. ........... 342/101
5,754,139 A 5/1998 Turcotte et al.
5,764,187 A 6/1998 Rudish et al.
5,920,286 A * 7/1999 Mohebbi ................... 342/383
5,929,811 A * 7/1999 Rilling ....................... 342/380
6,087,986 A * 7/2000 Shoki et al. ................ 342/383
6,255,990 B1 * 7/2001 King .......................... 342/377

* cited by examiner

*Primary Examiner*—Edward F. Urban
*Assistant Examiner*—Marceau Milord

(57) ABSTRACT

A method and apparatus for radio communication are presented. The method employs an antenna having multiple transceivers, each capable for receiving a part-signal of a signal received by the antenna. The phase and amplitude of the part-signals are modulated with a code that corresponds to the part-signal. The part-signals are then digitally processed using an analog-to-digital converter, and then demodulated with a demodulation code that is an inverse of the modulation code. The demodulated signal is then divided into separable part-signals which correspond to different reception patterns of the antenna.

8 Claims, 1 Drawing Sheet

METHOD AND ARRANGEMENT FOR RADIO COMMUNICATION

This application claims priority under U.S.C. §§119 and/or 365 to 9902370-7 filed in Sweden on Jun. 22, 1999; the entire content of which is hereby incorporated by reference.

BACKGROUND

The present invention relates to a method for radio communication. In particular, the invention is intended to be utilized with radio communication systems which comprise an electrically controlled antenna, for example in connection with a radar system or a mobile telephony system. The invention also relates to an arrangement for carrying out such a method.

In connection with radio communication systems, for example for radar applications, an antenna array is frequently utilized for transmitting and receiving radio signals. According to the prior art, such an antenna array can be constructed from a number of transceiver modules each of which comprises an antenna element, a controllable phase rotator and a controllable amplifier. The antenna elements can be made to cooperate as a unified antenna for transmission and, respectively, reception with sensitivity in the desired direction by arranging the antenna elements with a certain geometry and by suitable control of the said phase rotator and amplifier. Such an electrically controllable antenna, which does not comprise any moving parts, also provides the possibility of quickly redirecting the sensitivity of the antenna.

For a specific antenna, an antenna pattern with respect to, for example, transmission can be defined by distributing a common transmission signal to all transceiver modules of the antenna. The signals sent out, which are in phase with one another for a given direction, cooperate to produce a signal lobe whilst the signals for other directions are in opposite phase and thus cancel each other out. Between these two extreme cases, partial cancellation occurs to a varying degree. The resultant signal lobe as a function of directions can then be said to constitute the transmission pattern of the antenna. Both the direction and the shape of the transmission pattern can then be adapted to the current application of the antenna by suitably controlling the phase rotation and amplification of the respective transceiver module. The phase and amplitude values of this phase rotation and, respectively, amplification then constitute complex elements in the so-called control vector of the antenna pattern. This control vector is thus utilized for controlling the respective transceiver module, whereby a given antenna pattern is obtained.

In the case of reception with the antenna, the signals which are received at a respective module are, instead, summed to form a common input signal. In a corresponding manner as in the case of transmission with the antenna, a reception pattern is then defined by suitably controlling the phase rotation and amplification of the respective module.

An antenna pattern thus defines the gain of a given antenna as a function of the direction in space. In, for example, radar systems, an antenna pattern with a very high gain in a predetermined direction, the so-called main lobe, is normally aimed at. In the other antenna directions, the side lobes, as low a gain as possible is aimed at. In transmission, therefore, the signal sent out is to the highest possible degree concentrated in the main lobe and in reception, interfering signals in the side directions are avoided by minimizing the side lobe levels of the antenna.

In reception, an incoming signal is defined by summing the contributions from respective transceiver modules. Before the summing, the signals are normally weighted with a complex control vector which comprises parameters with respect to phase and amplification of a respective module. In so-called digital lobe shaping, which is a method which is known per se, this weighted summing is done digitally. More exactly, the analogue signals from a respective transceiver module are first analogue/digital converted, after which they are weighted with a vector and summed digitally. An advantage of digital lobe shaping is, for example, that the A/D-converted input signals can be stored in a memory for any subsequent signal processing. In this way, it is possible to study the received signals with different antenna patterns afterwards and by selecting different weighting functions. For example, the signal/noise ratio can be maximized in this way by looking for an optimum weighting function.

In an aeronautical radar system, for example, an active electrically controlled antenna array is normally used, which comprises a very large number of transceiver modules, of the order of 1000 or more. It would be desirable in itself to carry out digital lobe shaping of the signals from every one of these modules. However, such a method would require an A/D converter for every one of the transceiver modules. With today's technology, such a system would be very cumbersome and costly, which is a disadvantage.

This problem can be partially solved by dividing the antenna into a number of smaller parts which in each case contain a certain number of transceiver modules. Such an arrangement, however, would entail certain problems, primarily in the form of so-called grating lobes. This means that the side lobe level of the antenna becomes drastically higher when the summing of the signal from the part-antennas is carried out with a weighting function, the phase gradient of which does not correspond to the phase gradients of the part antennas.

From patent document U.S. Pat. No. 5,764,187, a system for digital lobe shaping in transmission and reception by means of an antenna array is already known. In transmission, a signal in the respective transceiver module is modulated by means of phase rotators and amplifiers. In reception with the antenna, in contrast, time, phase and frequency information from the transmitter is utilized in a digital signal processing unit. The antenna can be controlled in such a manner that its aperture is divided up into different independent parts which then correspond to different lobes.

A problem which arises with this known system relates to the fact that the antenna comprises a number of transceiver modules, each one of which comprises an A/D converter. If the antenna is to comprise a very large number of transceiver modules, this would lead to disadvantages in the form of high cost and a high weight of the antenna according to what has been described above.

SUMMARY

It is the aim of the present invention to obtain an improved method in radio communication, particularly in reception with an antenna array consisting of a large number of transceiver modules, whereby signals from different parts of the antenna or signals received from different directions can be separated and utilized for digital lobe shaping. This is achieved by means of a method, the characterizing features of which can be seen in Patent claim 1 following. The object is also achieved by means of an arrangement, the characterizing features of which can be seen in claim 8 following.

The invention consists of a method for radio communication with an electrically controlled antenna which comprises at least two transceiver modules which in each case comprise one antenna element, one controllable phase rotator and one controllable amplifier. The method according to the invention is utilized in reception with the antenna and comprises controlled phase rotation of a received signal in the respective transceiver module, controlled amplification of the received signal in the respective transceiver module, summing of the signals from the respective transceiver module, analogue/digital conversion of the summed signal, dividing up of the summed signal into at least two separable part-signals which correspond to different reception patterns of the antenna, and digital signal processing of the said part-signals. Furthermore, the invention comprises modulation of the said phase rotation and/or amplification with a predetermined code which corresponds to the respective part-signal and which is applied to the respective transceiver module before the said summing, and demodulation of the said analogue/digital-converted signal with a further code which is the inverse of the above-mentioned code. In this manner, the respective part-signals are separated.

By means of the invention, a number of advantages is achieved. Primarily, it may be noted that an antenna according to the invention can be constructed with a small number of A/D converters, which leads to cost and weight savings in comparison with the prior art. Moreover, the invention provides a possibility of instantaneously obtaining a number of antenna patterns with arbitrary directions in one and the same summation network with associated receivers. This is done by configuring the whole antenna in at least two different antenna patterns, whereby the said modulation is applied to the respective control vector for the differently configured antenna patterns, and by a corresponding demodulation with inverse codes which correspond to the different antenna patterns.

A particular advantage of the invention is that the said antenna can be reconfigured in a simple manner, that is to say the transceiver modules incorporated can be divided into different part-antennas with associated matching antenna patterns which can be selected, for example, in accordance with the operating condition of the radio communication system in question. This resetting is of particular interest in aeronautical radar systems since different antenna patterns can be utilized with different operating conditions of the aeroplane.

The term "transceiver module" means in this connection a transmitting and receiving unit which is included in an antenna and which comprises an antenna element, a controllable phase rotator and a controllable amplifier. The term "channel" means in this connection a separately detectable signal path for received part-signals originating from different antenna patterns.

BRIEF DESCRIPTION OF THE DRAWING

In the text which follows, the invention will be explained in greater detail with reference to a preferred illustrative embodiment and the attached FIG. 1 which, in principle, shows an arrangement according to the present invention.

DETAILED DESCRIPTION

Figure 1:
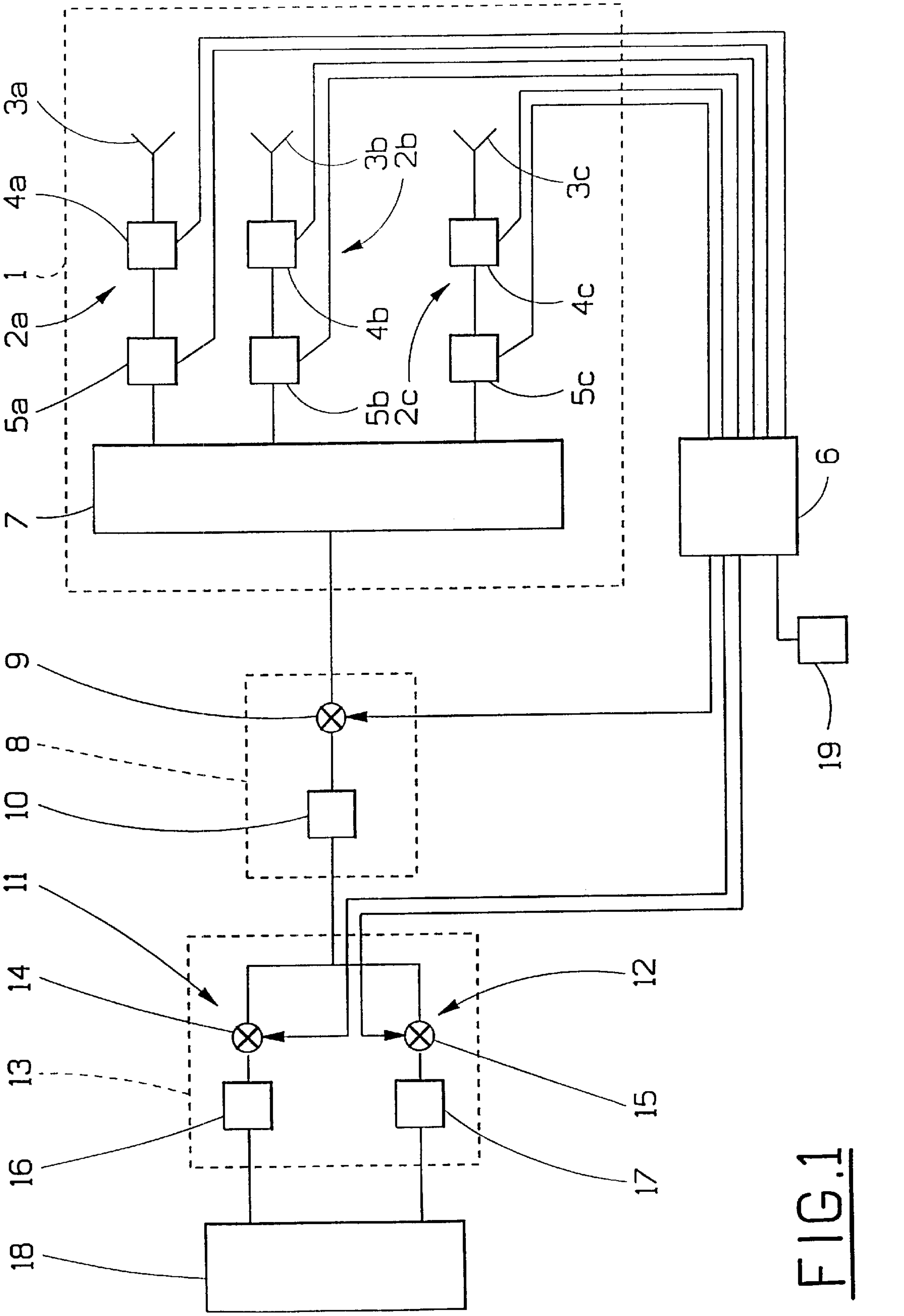

FIG. 1 shows, in principle, an arrangement according to the present invention. According to a preferred embodiment, the arrangement is used with an antenna array 1 which, in turn, comprises a predetermined number of transceiver modules 2*a*, 2*b*, 2*c* which in each case comprise an antenna element 3*a*, 3*b*, 3*c*, a phase rotator 4*a*, 4*b*, 4*c* and an amplifier 5*a*, 5*b*, 5*c*. The number of transceiver modules can vary and is very large, for example 1000 or more, in practical applications of the invention.

The antenna 1 can be used both for transmission and reception of radio signals. In the text which follows, however, it will only be described how the antenna can be used for reception.

In reception, a respective transceiver module 2*a*, 2*b*, 2*c* is thus arranged for amplification and processing of radio signals incident on the antenna elements 3*a*, 3*b*, 3*c*. For this purpose, the phase rotators 4*a*, 4*b*, 4*c* and amplifiers 5*a*, 5*b*, 5*c* are controllable. This control is effected by means of a computer-based control unit 6 which is arranged for adjusting the phase rotators and amplifiers according to a preselected reception pattern for the antenna 1, that is to say an antenna pattern which defines the desired sensitivity and gain of the antenna 1 as a function of the spatial direction. This is done in a manner known per se in that the respective module 2*a*, 2*b*, 2*c* is supplied with a control vector for the phase and amplitude control. More precisely, the adjustment of the phase rotators and amplifiers is carried out in that the control vector comprises complex elements which control the phase and, respectively, amplitude in a respective module 2*a*, 2*b*, 2*c*.

The respective transceiver modules 2*a*, 2*b*, 2*c* are connected to a summation unit 7 for summing the analogue signals which, when received, are present at the output of the respective amplifiers 5*a*, 5*b*, 5*c*. The output signal from the summation unit 7 is then fed to a receiver unit 8 where it is mixed with a signal with predetermined carrier frequency. For this purpose, the receiver unit 8 comprises a multiplier 9 in which the said carrier frequency signal is applied to the signal fed from the summation unit 7. The carrier frequency signal is supplied through a connection between the control unit 6 and the multiplier 9. In this manner, a signal output from the multiplier 9 is supplied which is tuned to a frequency which is suitable for feeding the signal to a subsequent analogue/digital converter (or "A/D converter") 10.

It is a basic principle underlying the present invention that the signal received by the antenna 1 can be divided up into two or more separable part-signals by means of a phase and amplitude modulation which is applied to the respective signal in a respective transceiver module 2*a*, 2*b*, 2*c*. For this purpose, the controllable phase rotators 4*a*, 4*b*, 4*c* and controllable amplifiers 5*a*, 5*b*, 5*c* are utilized, which are supplied with individual phase and amplitude values which correspond to the sum of the coded control vectors for the respective desired part-signal.

If, for example, two different part-signals from two different part-antennas are wanted, a predetermined number of transceiver modules of the antenna 1 can be assigned a first phase and amplitude code whilst the remaining transceiver modules are in a second phase and amplitude code. This corresponds to the antenna 1 being divided into two part-antennas. The modulation is controlled by means of the control unit 6 which is arranged to control the phase rotators and amplifiers with the sum of the two phase and amplitude-coded control vectors. In this connection, it is provided that the codes which correspond to the respective configuration of the antenna 1 are orthogonal with respect to one another.

According to what will be described in detail below, a respective part-signal can be detected again by demodulating the signal after the A/D converter 10. For this purpose, the summed, A/D-converted signal is applied with a code set which corresponds to the inverse codes of the respective phase and amplitude codes which are applied to the respective phase rotator 4*a*, 4*b*, 4*c* and amplifier 5*a*, 5*b*, 5*c*. Thus, the signal from the first group of transceiver modules can be recreated by mixing with a first demodulation code (which corresponds to the inverse of the said first phase and amplitude code) whilst the signal from the remaining transceiver modules is recreated by mixing with a second demodulation code (which corresponds to the inverse of the said second phase and amplitude code). In this manner, two different part-antennas can be defined whereby a given number of transceiver modules are used for defining the one part-antenna and the rest of the transceiver modules are used for defining the second part-antenna.

According to an alternative embodiment, the antenna 1 can be configured in such a manner that two part-antennas are defined, whereby these part-antennas partially overlap one another. In this manner, the first part-antenna defines a first signal lobe and the second part-antenna defines a second signal lobe. Due to the fact that the two part-antennas partially overlap one another, an advantage can be obtained in that the width of the signal lobes can be adjusted as a function of the size of the part where the part-antennas overlap one another.

The received signal is divided up into, for example, two different frequency bands by means of a suitable choice of coding by means of a suitable choice of the said phase and amplitude code. It can be said that these two frequency bands define respective part-antennas. These part-antennas can be used for providing two different lobes of the antenna 1 which can be utilized in subsequent digital signal processing, for example a digital lobe shaping.

Referring back to FIG. 1, it can be seen that the signal at the output of the A/D converter 10 is divided up into at least two separate channels 11, 12 which form part of a decoding and filtering unit 13. The said unit 13 also comprises a first decoding multiplier 14 and a second decoding multiplier 15, both of which are connected to the control unit 6. According to the invention, the demodulation described above is carried out by providing the multipliers 14, 15 with a respective inverse code of the phase and amplitude codes with which the phase rotators 4*a*, 4*b*, 4*c* and amplifiers 5*a*, 5*b*, 5*c* are influenced.

After demodulation, two signals which correspond to the two part-antennas can be separated. In particular, this is made possible by the fact that the respective channel 11, 12 comprises a first low-pass filter 16 and, respectively, a second low-pass filter 17 which can then be utilized for filtering out signals within unwanted frequency bands in the respective channel 11, 12. The output signals from the respective filter 16, 17 are then fed to a digital signal processing unit 18, where the signals from the respective channel 11, 12 are summed and evaluated. In particular, the two different incoming received signals can be weighted with different factors and utilized in digital lobe shaping.

The number of channels of the antenna according to the invention, that is to say the number of phase and amplitude codes for modulation and the number of inverse codes for demodulation, can be two or more. In normal applications, 2–4 channels are suitably used but up to approximately 10 different channels are also possible.

According to an alternative embodiment of the invention, the antenna 1 can be utilized for creating a number of simultaneous antenna patterns which then utilize the signals from all the transceiver modules 2*a*, 2*b*, 2*c*. In the case where, for example, two simultaneous antenna patterns are desired, the modules can be modulated with two different simultaneous phase and amplitude codes which are suitably selected in such a manner that the control vector which corresponds to one antenna pattern is applied to the respective transceiver module without being affected (that is to say its phase and amplitude remain constant) whilst the control vector for the second antenna pattern periodically changes between 0° and 180° and is applied to the respective transceiver module. The two modulated control vectors are thus superimposed and, in turn, are applied to the respective transceiver module. In this manner, two separable signals are obtained which relate to two different antenna patterns. These two signals are summed and A/D-converted. After that, a decoding or demodulation with inverse codes, which correspond to the inverse of the phase and amplitude codes which were applied to the transceiver modules, takes place. This modulation and demodulation is performed by means of the control unit 6. The frequency with which the phase code and inverse code are changed (in this case of the control vector for the above-mentioned second antenna pattern) is of the order of approximately 10 MHz in normal applications.

This alternative embodiment of the invention is used for increasing the sensitivity of the antenna 1 in, for example, two independent directions. In this manner, all the transceiver modules can be utilized for defining these two simultaneous lobes. As an alternative, this embodiment can be utilized for obtaining, for example, three different simultaneous lobes. In such a case, use is suitably made of a first control vector which remains unaffected whilst a second control vector is modulated with a phase contribution which is changed between 0°–120°–240°–0°, and a third control vector which is modulated with a phase contribution which is changed between 0°–180°–0°–180°. Other phase values are possible. To obtain separable channels, however, orthogonal phase angles are utilized for this modulation and demodulation. Corresponding inverse codes are also selected for demodulation.

The invention can thus be utilized in such a manner that selected transceiver modules are supplied with a first modulation code and, respectively, a second modulation code. According to the invention, this modulation is carried out before the summing of the signals takes place in the summation unit 7. Furthermore, a demodulation of the summed signal is carried out after A/D conversion and by utilizing an inverse code to the said phase and amplitude code. In this manner, two separate channels, that is to say two separable signals to corresponding different parts of the antenna 1, are defined according to the invention. According to the invention, either optional parts of the aperture of the antenna 1 can be defined or else different simultaneous antenna patterns can be obtained.

If necessary, the antenna 1 can be reset very quickly between different configurations, that is to say the transceiver modules 2*a*, 2*b*, 2*c* incorporated can, for example, be divided into different sets of part-antennas with associated suitably adapted antenna patterns. This resetting can also be done automatically which can be of particular interest if the invention is utilized in a radar system in an aircraft. In such a case, the control unit 6 can be arranged to assume a predetermined configuration which is based on a current operating condition of the aircraft or the radio communication system generally. If, for example, the aircraft carries out a certain flight manoeuvre, the antenna 1 can thus be set into a position which is favourable for this flight manoeuvre. According to the invention, the aircraft can then be provided with sensors or diagnostic units, which is symbolically indicated by reference number 19 in FIG. 1, which detects a condition in which resetting is to be carried out. This resetting can then be done automatically by means of the control unit 6.

The invention is not limited to the embodiment described above but can be varied within the context of the patent claims following. For example, the invention is not limited to a given number of transceiver modules or a certain number of channels. Furthermore, the invention can be used in connection with radar systems or other forms of communication systems which are based on the use of an antenna array and digital lobe shaping.

What is claimed is:

1. A method comprising the steps of:

receiving a signal in an antenna having a plurality of transceiver modules, each transceiver module including an antenna element for receiving a part-signal of the received signal, a controllable phase rotator and a controllable amplifier;

controlling a phase rotation of the part-signal using the phase rotator;

controlling an amplification of the part-signal using the amplifier;

modulating at least one of the phase rotation and the amplification of the part-signal with a predetermined modulation code to correspond to the part-signal;

summing all part-signals received in the respective transceiver modules;

converting the summed signal from an analog signal to a digital signal;

demodulating the converted signal with a demodulation code that is an inverse of the modulation code; and dividing the demodulated signal into at least two separable part-signals which correspond to different reception patterns of the antenna.

2. The method according to claim 1, wherein the modulation code corresponds to a number of channels which are utilized as signal paths for the respective part-signal.

3. The method according to claim 1, wherein a control vector is utilized for controlling the phase rotation and the amplification of the part-signal by modulating the control vector with the modulation code.

4. The method according to claim 1, wherein a predetermined number of transceiver modules are assigned a first modulation code and the remaining transceiver modules are assigned a second modulation code forming a plurality of part-antennas within the antenna each having an antenna pattern.

5. The method according to claim 3, wherein the antenna patterns of at least two of the part-antennas partially overlap one another.

6. The method according to claim 1, further comprising the step of assigning substantially all of the transceiver modules of the antenna a modulation code having at least two superimposed codes contained therein which correspond to two different antenna patterns, wherein a first code is applied to at least one of the transceiver modules without affecting phase rotation and amplification, and a second periodically changing code is applied to at least one of the transceiver modules, such that when a corresponding changing demodulation is performed on the converted signal, at least two simultaneous antenna patterns are defined at the antenna.

7. The method according to claim 1, further comprising the step of automatically reconfiguring a reception pattern of the antenna as a function of a detected operating condition in connection with the antenna.

8. An apparatus comprising:

an antenna having a plurality of transceiver modules, each transceiver module including an antenna element for receiving a part-signal of a received signal;

a phase rotator coupled to the antenna element for controlling a phase rotation of the received part-signal;

an amplifier coupled to the phase rotator for controlling an amplification of the received part-signal;

a modulator for modulating at least one of the phase rotation and the amplification of the part-signal with a predetermined modulation code to correspond to the part-signal;

a summation unit for summing all part-signals received in the respective transceiver modules;

an analog-to-digital converter for converting the summed signal from an analog signal to a digital signal;

a demodulator for demodulating the converted signal with a demodulation code that is an inverse of the modulation code; and a dividing unit for dividing the demodulated signal into at least two separable part-signals which correspond to different reception patterns of the antenna.

* * * * *